US008433278B2

(12) United States Patent
Adams et al.

(10) Patent No.: US 8,433,278 B2
(45) Date of Patent: Apr. 30, 2013

(54) SYSTEM AND METHOD FOR SELECTING A MESSAGE TRANSPORT FOR A MULTI-MODE COMMUNICATION DEVICE (75) Inventors: Neil Patrick Adams, Waterloo (CA); Ian Robertson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1147 days.

(21) Appl. No.: 11/931,632

(22) Filed: Oct. 31, 2007

(65) Prior Publication Data
US 2009/0109898 A1 Apr. 30, 2009

(51) Int. Cl.
*H04Q 7/00* (2006.01)

(52) U.S. Cl.
USPC .......................................................... 455/328

(58) Field of Classification Search .................. 455/456, 455/552; 370/328
See application file for complete search history.

(56) References Cited

U.S. PATENT DOCUMENTS

| | | | |
|---|---|---|---|
| 6,934,558 B1 * | 8/2005 | Sainton et al. | 455/552.1 |
| 7,737,896 B1 * | 6/2010 | Suri et al. | 343/702 |
| 2004/0151162 A1 * | 8/2004 | Ramaswamy | 370/352 |
| 2004/0235476 A1 * | 11/2004 | Martlew | 455/436 |
| 2005/0070307 A1 * | 3/2005 | Charbonnier | 455/456.3 |
| 2005/0237985 A1 * | 10/2005 | Stewart et al. | 370/338 |
| 2005/0243863 A1 * | 11/2005 | Engelhart | 370/469 |
| 2006/0077981 A1 * | 4/2006 | Rogers | 370/395.21 |
| 2006/0126646 A1 * | 6/2006 | Bedingfield | 370/401 |
| 2007/0242619 A1 * | 10/2007 | Murakami et al. | 370/252 |
| 2007/0260691 A1 * | 11/2007 | Kallqvist et al. | 709/206 |
| 2007/0291717 A1 * | 12/2007 | Williams et al. | 370/338 |
| 2008/0137817 A1 * | 6/2008 | Wilson et al. | 379/88.17 |
| 2008/0240122 A1 * | 10/2008 | Richardson et al. | 370/401 |
| 2009/0028082 A1 | 1/2009 | Wynn et al. | |
| 2009/0052393 A1 * | 2/2009 | Sood et al. | 370/331 |

FOREIGN PATENT DOCUMENTS

| | | |
|---|---|---|
| EP | 1612996 A1 | 1/2006 |
| EP | 1708526 A1 | 10/2006 |

* cited by examiner

*Primary Examiner* — Sulaiman Nooristany
(74) *Attorney, Agent, or Firm* — McCarthy Tétrault LLP (57) ABSTRACT

The present disclosure relates to a system and method for selecting a network for use by a communication device to process a data transmission. In the method, the following actions are conducted: tracking transmission characteristics of networks used by the device; maintaining a set of options for the device relating to the networks, including at least one option based on the transmission characteristics; utilizing a selected option identify a selected network to process the data transmission by the communication device; and processing the data transmission using the selected network.

17 Claims, 6 Drawing Sheets

SYSTEM AND METHOD FOR SELECTING A
MESSAGE TRANSPORT FOR A
MULTI-MODE COMMUNICATION DEVICE

The present disclosure described herein relates to a system and method for selecting a communications transport mechanism for a wireless, communication device. In particular, the system and method may select an appropriate transport mode for sending an outbound message, such as via a Wireless-Fidelity (Wi-Fi) or a cellular connection.

BACKGROUND

Wireless handheld mobile communication devices perform a variety of functions to enable mobile users to stay organized and in contact with others in a communication network through email, schedulers and address books.

As wireless communication devices are portable, they connect and communicate with several different wireless communication networks as they roam. A multi-mode wireless communication device provides multiple types of message transports for the device, giving it more connection flexibilities for its transmissions, allowing some types of transmissions to be sent over different communication networks. For example, a dual-mode communication device may be both cellular and Wi-Fi enabled. As such, an email may be sent from that device via a Wi-Fi connection through a Wireless Local Area Network (WLAN) adhering to Wi-Fi transmission protocols; additionally or alternatively, the same email may be sent via a cellular network connection following its transmission protocols. Each communication network has performance and costing characteristics which may make it preferable for a device to use one network over another for its transmissions, depending on the circumstances.

BRIEF DESCRIPTION OF THE DRAWINGS

Embodiments of the present disclosure will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the present disclosure. In the description which follows, like parts are marked throughout the specification and the drawings with the same respective reference numerals.

In a first aspect, a method for selecting a network for use by a communication device to process a data transmission is provided. The method comprises: tracking a transmission characteristics of networks; accessing a set of options to identify a set of the transmission characteristics; evaluating the transmission characteristics for each network networks to identify a selected network for each option; and when an option is selected, processing the data transmission using the related selected network.

In the method, prior to processing the data transmission using the selected network, the method may further comprise: displaying the set of options in a list on the device; and utilizing a selected choice from the list to be the selected option.

In the method, the data transmission may be an outbound transmission; the networks include at least a cellular network and a Wireless-Fidelity (Wi-Fi) network; and one transmission characteristics is a cost to transmit the outbound transmission.

In the method, the outbound transmission may be an email.

In the method, the options may include an option to use an immediately previously used network.

In the method, the options may further comprise an option identifying a network that has the strongest transmission characteristics.

In the method, the options may further comprise an option identifying a network that has a predetermined level of security.

In the method, the options may further comprise an attachment option identifying a default network that has been identified to transmit data transmissions having attachments.

In the method, the options may further comprise an option identifying a network to transmit the data transmission when the data transmission is a predetermined size.

In the method, the options may be presented as single options or a collection of any set of options.

In the method, the networks may include (at least) two networks of the same technology. Further, the list may further comprise an option to use a network that has accesses those two networks.

In the method, during transmission of the data transmission, each data packet associated with the data transmission may be marked as being transmitted via the selected network.

In the method, transmission of the data transmission through the network may be deferred if the network is currently unavailable to the device until the network is available to the device.

In a second aspect, a communication device having communication capabilities several networks is provided. The device comprises: a microprocessor; a display; memory; a communication subsystem providing transmission and reception of a data transmission with those networks; a first module to track transmission characteristics of the networks and to store results in the memory; a second module to monitor a set of options relating to the networks based on transmission characteristics and to determine a selected network after evaluating the options to carry the data transmission; a third module to selectively display a list relating to the set of options on the display and to allow a selection to be made to from the list to become the selected network; a fourth module to process the data transmission at the device utilizing the selected network.

In the device, the data transmission may be an outbound transmission; the networks may include at least a cellular network and a Wireless-Fidelity (Wi-Fi) network; the transmission characteristics may include a cost of usage to transmit the outbound transmission; and the options may include a cost-based option reflecting the cost of usage.

In the device, the outbound transmission may be an email and the fourth module may be an application operating through the microprocessor to generate and review emails directed to the device.

In the device, the options may include a default option to select an immediately previously used network for the selected network.

In the device, the options may include an option to select a network that has the strongest transmission characteristics.

The device may further comprise a fifth module to encode the email in a manner determined from a selected encoding option. Therein, the options may include an encoding option for the email prior to the third module configuring the email for transmission using the selected network.

In the device, the fourth module may mark each data packet associated with the email as being transmitted by the selected network.

In the device, the fourth module may defer transmission of the email through the selected network if the selected network is currently unavailable to the device until the selected network is available to the device.

In a third aspect, a method for selecting a network for use by a communication device to process an outbound data transmission from the device is provided. The method comprises: tracking transmission characteristics of the networks; accessing a set of options to identify a set transmission characteristics; evaluating the set transmission characteristics for each network to identify a selected network for each option; displaying the options in a list on a display on the device in a graphical user interface (GUI); and when an option is selected through said GUI, processing the outbound data transmission using the selected network associated with the selected option. Preferably, one network is Wireless-Fidelity (Wi-Fi) network; and one transmission characteristic is a cost to transmit the outbound transmission.

In the method, the options may further include at least one of the following options: a first option to use an immediately previously used network for the selected network; a second option to use a first network that has a transmission characteristic stronger than a transmission characteristic of a second network; and a third option to use a network that has a predetermined level of security.

In other aspects, various combinations of sets and subsets of the above aspects are provided.

Exemplary details of embodiments are provided herein. Briefly an embodiment provides a method and system for a multi-mode communication device, such as a dual-mode cellular phone, to select a network for transmitting and/or receiving its data, such an email. A choice for a network may be provided to the device at some stage during the processing of transmission of the data. The choice may be encoded as a default selection, which may be updated. Additionally, the network choices may be evaluated to identify a preferred option for each selection and then the selection is used to transmit the data. Additionally, or alternatively, a set of choices (each possibly having separate defaults) may be presented to the user via a user interface on the device. For example, for an email, the user interface may be presented on the device when the email is first composed or when it is about to be sent. In order to assist with the selection process, an embodiment tracks, provides and presents characteristics relating to each available network to the user on the device. The characteristics may relate to transmission quality, costing, signal strength and others. The characteristics may be monitored continuously or at given intervals (e.g. once every 10 minutes or so) or at given events (e.g. at the composition of an email or at the initiation of a send command).

First, a description is provided on general concepts and features of an embodiment, its related network connections and characteristics that may be presented to the user for each network connection available to the device. Then, further detail is provided on an exemplary algorithm used to select which network connection to use for the transmission.

Figure 1:
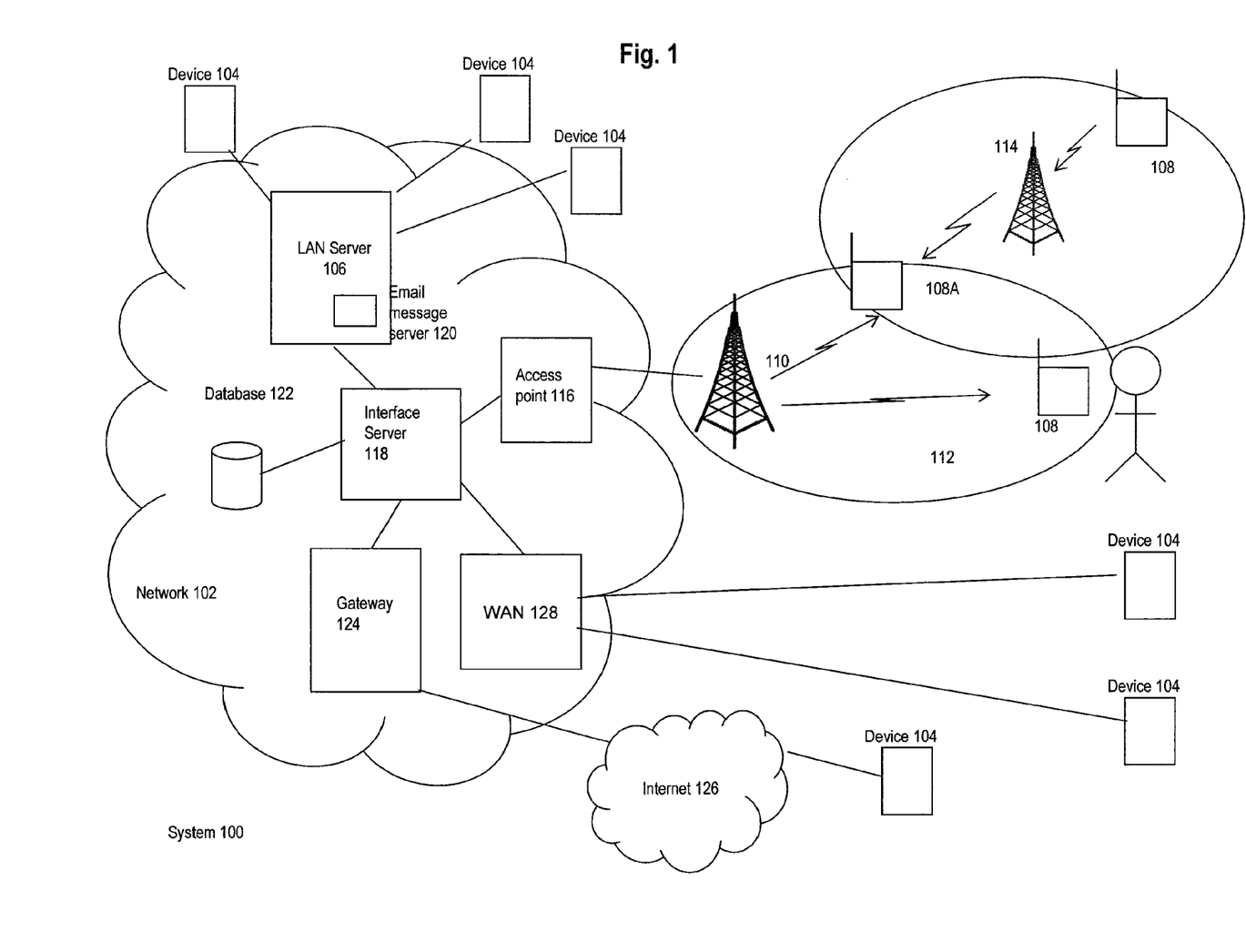
FIG. 1 is a schematic diagram of a plurality of communication networks that are in communication with a wireless device as provided in an embodiment.

FIG. 1 provides details on a set of interconnected networks are provided in communication system 100. Exemplary networks in system 100 are network 102, Local Area Network (LAN) 106, wireless network 110, cellular network 114 and Wide Area Network (WAN) 128. Each is described in turn.

Network 102 provides a suite of applications, services and data to its connected devices 104 through its local associated servers. Network 102 can be implemented in any known architecture, providing wired or wireless connections to its elements.

Wireless network 110 normally delivers information to and from mobile devices via RF transmissions between base stations and the mobile devices 108 through transmission area 112.

WAN 128 is connected to network 102 and provides connections among its (remote) devices 104 and other devices in system 100.

Cellular network 114 provides wireless communications between wireless devices 108 that are within the coverage area of cellular network 114. The coverage area may overlap with the coverage areas of other networks, such as LAN 106, network 102 and wireless network 110. Cellular network 114 provides voice and data services to devices 108. Data-centric technologies for cellular network 114 include the Mobitex (trademark) Radio Network ("Mobitex") and the DataTAC (trademark) Radio Network ("DataTAC"). Voice-centric technologies for cellular network 114 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), and High Speed Packet Access (HSPA), etc.

In network 102, a series of linking modules and servers are provided to connect network 102 to other networks. Interface server 118 provides an interface for network 102 to a wireless network 110. Functions such as providing addresses for mobile devices 108, encoding or otherwise transforming messages for wireless transmission, and any other required interface functions are performed by the server 118. Although server 118 operates with the single wireless network 110, wireless gateways may be configured to operate with more than one wireless network in alternative embodiments. WAN 128 is also connected to network 102 via server 118. As such, any device (computer) 104 (directly) connected to WAN 128 may exchange messages with a mobile device 108 in wireless network 110 through interface 118. Alternatively, private wireless network gateways, such as wireless Virtual Private Network (VPN) routers, could be implemented to provide a private interface to a wireless network. For example, a wireless VPN router implemented in LAN 106 may provide a private interface from LAN 106 to one or more mobile devices 108 through interface server 118.

Wireless VPN routers and other types of private interfaces to mobile device 108 may effectively be extended to entities outside the LAN 106 by providing a message forwarding or redirection system that operates with the message server using redirectors known to those of skill in the art. An exemplary system is described in U.S. Pat. No. 6,219,694. In this type of redirection system, incoming messages received by the message server and addressed to a user of a mobile device 108 are sent through the wireless network interface, either a wireless VPN router, a wireless gateway or other interface, to the wireless network 110 and to the user's mobile device 108.

In network 102, LAN 106 provides a messaging client to its connected devices 104. It is normally located behind a security firewall (not shown) in network 102. Within LAN 106, message server 120 operates on a computer behind the firewall and serves as the primary interface to exchange messages both within the LAN 106. Two known message servers 120 are Microsoft Exchange (trademark) and Lotus Domino (trademark). Messages are received by message server 120, distributed to the appropriate mailboxes for user accounts addressed in the received message, and then accessed by a user through a computer system operating as a messaging client. A Wireless Application Protocol (WAP) gateway provides an alternate interface to a user's mailbox on server 120, through which a list of messages in a user's mailbox on the message server, and possibly each message or a portion of each message, could be sent to the mobile device 108. Database 122 provides a data storage system for one or more elements in network 102, including LAN 106. Security systems within network 102 can be provided by known techniques and systems. Gateway 124 provides and monitors selected communications between elements in network 102 and external devices connected through Internet 126.

Further detail is now provided on wireless network 110. As with cellular network 114, wireless network 110 may be a data-centric network, a voice-centric network, or a dual-mode network. In one embodiment, wireless network 110 is implemented as a Wi-Fi network generally following standards set by the IEEE LAN/MAN Standards Committee, known as IEEE 802, through its working group "11". The 802.11 standard defines media access control (MAC) and physical (PHY) layers in the Open Systems Interconnection (OSI) protocol model for WLAN. Such standards are known to those of skill in the art. Administrative functions for wireless network 110 may be provided by software controlling it. The software may administer functions such as network identification and network access parameters. The initial 802.11 standard was followed with a series of amendments, where each amendment was identified by an alphabetic suffix following in the standard's numeric identifier "802.11". The family of 802.11 amendments is sometimes referred to as the 802.11x family. Currently, the 802.11 amendments encompass six wireless modulation techniques that all use the same communication protocol among their communicating elements. Such networks are deployed in one or more of the five current versions of 802.11: 802.11a, b, g and n. Specific transmission details and parameters of these networks are known to those of skill in the art.

Wireless network 110 includes an antenna and supporting radio transmission equipment known to those skilled in the art. Access point (AP) 116 is shown in network 102 and in an embodiment, each AP 116 is an IEEE 802.11 radio receiver/transmitter (or transceiver) and functions as a bridge between its respective WLAN 110 and network 102. For security, each AP 116 may be communicatively coupled to network 102 through a respective firewall and/or VPN (not shown). The AP provides data distribution services among devices 108 within wireless network 110 and between devices 108 in wireless network 110 and other devices in other connected networks. One distribution service provided by access point 108 for its related stations is to establish a logical connection to its communicating devices 108.

Device 108 may be a data communication device, a voice communication device, or a multiple-mode device capable of voice, data and other types of communications. Wireless device 108 may be a handheld device, cell phone, smart phone, personal digital assistant (PDA), and/or computer (either desktop or portable) having a (wireless) network card, network adapter and/or network interface controller (NIC) installed therein.

In certain locations, device 108 may be able to simultaneously access to multiple networks, such device 108A which is within the coverage zones of wireless network 110 and cellular network 114 simultaneously. In an embodiment device 108A has communication modules to communicate with both networks 110 and 114. Device 108A also has modules to evaluate each connection to each network and to provide the user with information and options to allow him to select an appropriate network for a particular transmission, such as an outbound data transmission.

Different networks have different operating characteristics. For example, cellular networks generally have slower data rates compared with LAN/WLAN networks, and have relatively high fees (especially when roaming). However, cellular networks are accessible in a very wide swath of locations and attachment to cellular networks is generally automatic and transparent to the user and the underlying application. Wi-Fi networks provide relatively fast data rates and are generally cheaper in fees (or even free) compared with cellular networks. However, Wi-Fi networks presently are accessible in select locations and attaching to a Wi-Fi network requires actions to be taken by the user. Further, the user actions often need to be repeated for different Wi-Fi networks. Cost is not the only consideration when choosing a network. Additionally, it may be useful to choose a network based upon the operating characteristics of the networks. Different characteristics may be more or less important for the current communications depending on the context, location, time, size, or other parameters or characteristics of the current communication.

It will be appreciated that device 108A may be in simultaneous contact with several networks of a given technology class or type. For example, device 108A may simultaneously have connections to several Wi-Fi networks and/or several cellular networks.

Creation, encapsulation and transmission of an outbound data transmission from device 108A may follow any structured protocols. However, one commonly used set of layered applications is provided in the Open Systems Interconnection (OSI)-connection layers. Therein, the host layers generally handle the creation of the outbound transmission through the software operating on device 108A and the media layers handle the encapsulation and transmission the outbound transmission. The selection of the transmitting network (e.g. Wi-Fi or cellular) will determine how the outbound transmission is encapsulated and transmitted. Each data packet of the outbound transmission may be tagged with data to identify the transmitting network. For some outbound traffic, data may be encapsulated by applications following the OSI model, but then the actual transmission of the data stream may be handled by a process that may not necessarily conform to the OSI model.

Figure 2A:
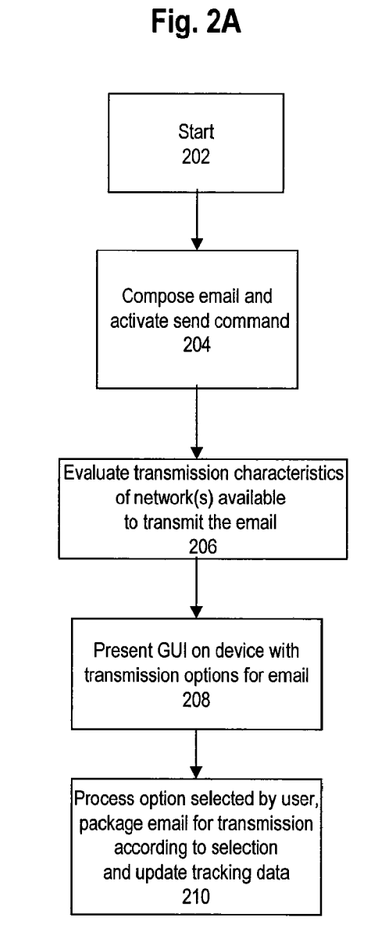
FIG. 2A is a flowchart of a process executed by the wireless device of FIG. 1 in creating an outbound email transmission and evaluating connections to communication networks to select a network to use for its transmissions.
Figure 2B:
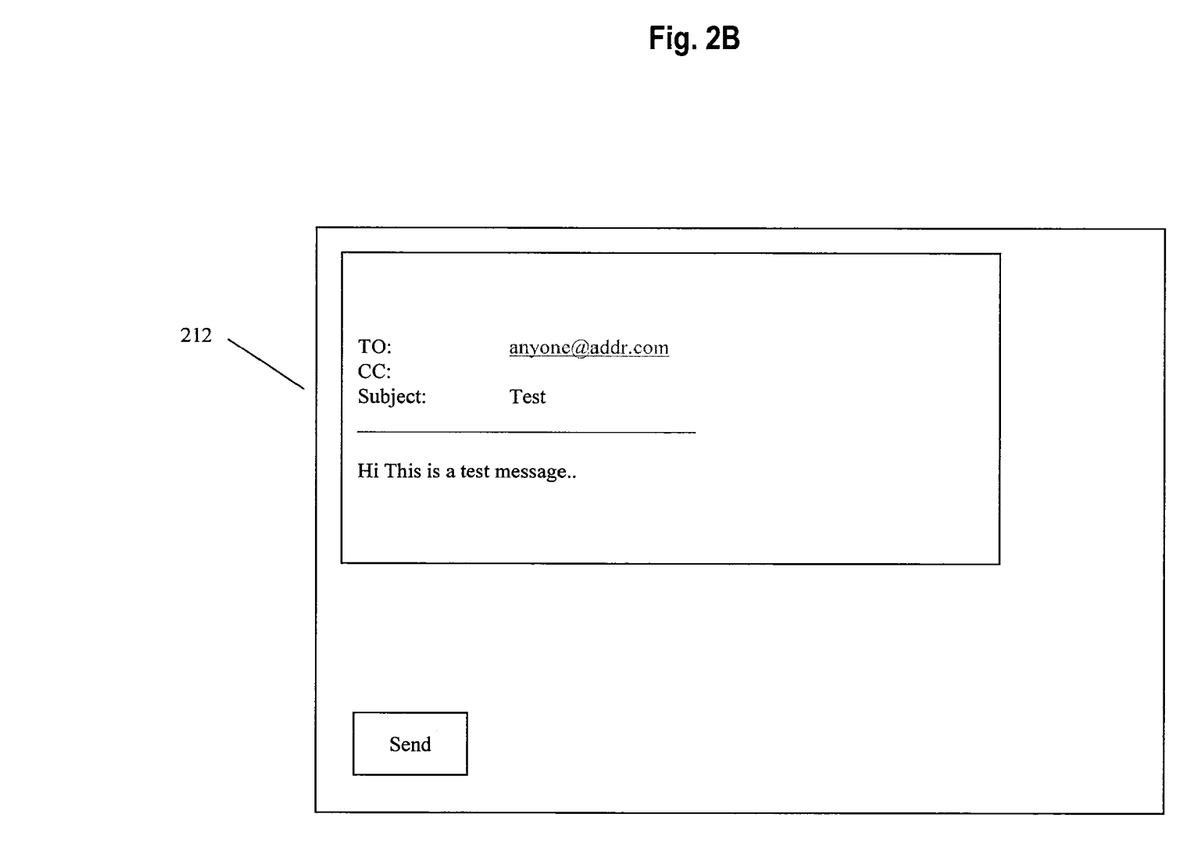
FIG. 2B is a schematic diagram of an exemplary graphical user interface (GUI) generated on the device of FIG. 1 when executing the process of FIG. 2A.
Figure 2C:
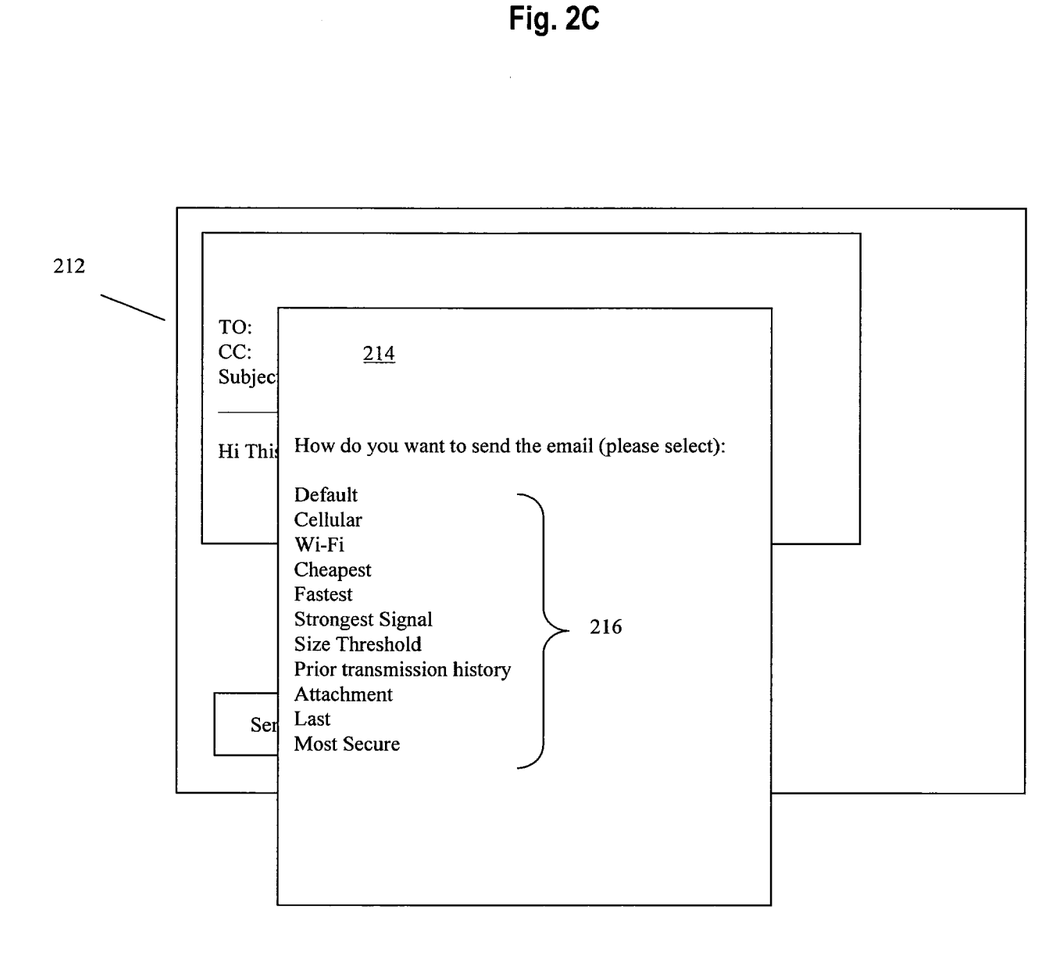
FIG. 2C is a schematic diagram of a second GUI generated on the device of FIG. 1 when executing the process of FIG. 2A.
Figure 4:
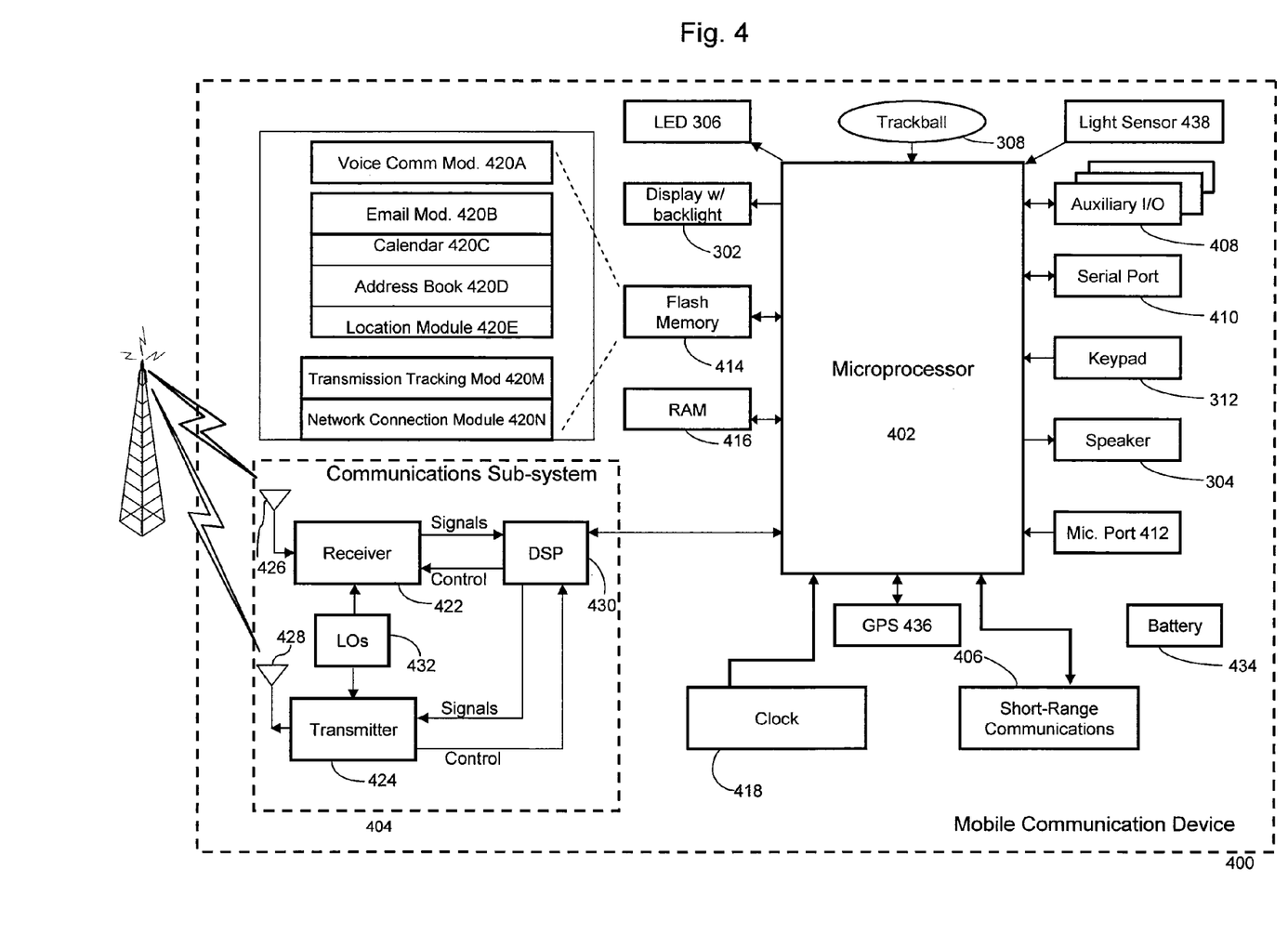
FIG. 4 is a block diagram of certain internal components of the device of FIG. 3.

Referring to FIGS. 2A-2C, further details on an embodiment are provided. In FIG. 2A, process 200 is executed on device 108A to compose an outbound data transmission then to determine options for transmission of the outbound transmission, then to package and send the outbound transmission according to a selection made by the user. It will be appreciated that process 200 may be implemented on device 108A in one or more of the following: software, firmware and hardware modules. For example, FIG. 4 shows email module 420B, transmission tracking module 420M and network connection module 420N. Each module will be described later in more detail. For the purpose of describing process 200, the outbound transmission is an email.

At step 202, process 200 starts. At step 204, an email module has been activated and an outbound email has been composed in the graphical user interface presented by the email program on device 108A. Referring to FIG. 2B, GUI 212 is an exemplary GUI generated by the email module used to control creation of the email. When the user has completed the email, activation of the "send" command initiates a process to select a transport mode for the email. The command may be activated through a predefined "send" icon or a selection command through a command menu in the program.

Referring back to FIG. 2A, after the send command is activated, before the actual transmission of the email, in step 206, device 108A evaluates the transmission characteristics of network(s) available to transmit the email. This may involve actively reconfirming operating parameters of all types of transmission modes that are able to transmit the email by device 108A (e.g. cellular, Wi-Fi, etc.). This may also involve accessing a database containing last parameters for each transmission mode. Alternatively or additionally, a set of transmission characteristics may be stored for each network and the stored data may be periodically updated.

Once the evaluations (and/or data accesses) are complete, process 200 collects and analyses the result. From the results, a set of transmission options are available to the user. The options are presented on device 108A through a GUI in step 208. Referring to FIG. 2C, GUI 214 is an exemplary GUI generated on device 108A to present the options 216 to the user. The GUI also allows a selection to be made from the options. As noted, options 216 provide a selection of transmission networks, including, for example, "default", "cellular"; "Wi-Fi"; "cheapest"; "fastest", "strongest signal", "size threshold", "prior transmission history", "attachment," "last" and "most secure." Other options may also be provided. Sub-options and parameters may be provided for each option to tailor its parameters. It can be seen that the options can be grouped into one or more broad categories, including: options based on transmission costs or histories (e.g. "cheapest", "prior transmission history", etc.); options based on a characteristics of a network (e.g. "fastest", "strongest signal", "most secure" etc.); characteristics of the current transmission (e.g. "attachment", "size threshold", etc.), options providing default(s) (e.g. "default", "cellular", "Wi-Fi", "last", etc.). Other categories may be provided. Options may be listed in one or more categories. Options may be presented as single options in separate GUIs.

A brief description of exemplary options is below. It will be appreciated that other options may be provided and that the options listed below are not exhaustive. Names can be changed for the options.

One option is a "default" option, where default network is selected. The default network may be set to be the lower cost route. The parameters for the default may be changed. The default may also be set to be the last network selected for the last communication sent by the program (or any other program).

Another option is a "cellular" option that send the message over the connected cellular network.

Another option is a "Wi-Fi" option that sends the message over the connected Wi-Fi network.

Another option is a "Cheapest" option that selects the network having the lower cost. Cost may be measured to account for any one or more cost-based factors, including access time charges, roaming charges, prime time charges, excess charges in view of prepayment plans, power usage to transmit the message, etc.

Another option is a "Fastest" option that selects the network having the faster available data transmission rate.

Another option is a "Strongest" option that selects the network having the stronger current transmission signal quality or other measure of strength for a network.

Another option is a "Size Threshold" option that selects the network based on the size of the message and/or its attachment. The user may be allowed to enter a size parameter through a GUI selection: "Send over Wi-Fi if message exceeds N Kbytes". This option may be provided as a default. This default option may save the user from having to modify that field each time a message is sent. Alternatively all messages under a certain size (in Kbytes) may be sent over a selected network (e.g. cellular).

Another option is a "Prior Transmission History" option where the selected network is chosen based on the amount of data that has been sent over a given network over a given time period. If one network has a reached a data limit, another network would be selected. For example if the user's data plan for a given network (e.g. cellular) is 1 MByte, this option would then switch the selected network and send subsequent messages via another network (e.g. Wi-Fi) when the data plan approaches or passes its limit. Additionally, any default settings for a selected network may be changed when a switch occurs. The selected network may revert to a previous network upon a given event (e.g. the changing of a month or the billing period would reset the limit).

Another option is an "Attachment" option where the selected network is determined on a network's abilities to process an attachment. The abilities could include cost, speed and/or security thresholds.

Another option is a "Last" option where the message is sent over the last used network.

Another option is a "Most secure" or "Sufficiently secure" option where the selected network is chosen based on the level of security provided by a given network.

It will be appreciated that in order to determine the "cheapest" network, the process may compare a cost-based factor for a network against comparable cost-based factors of the other networks. Similarly, in order to determine the "fastest" or "strongest" network, the process may compare relevant speed and strength factors of the networks against each other. Once all comparisons are made, the process can rank them and present options to the user in the GUI. It will be appreciated that the options in GUI 214 may be incorporated into GUI 212. It will be appreciated that when parameters are set for an option and an option is selected for the transmission network, the user may not necessarily be prompted with a network choice, as the embodiment would select an appropriate transport based on current setting. A default selection may be provided, having regard to current cost and quality characteristics of current networks. For example, with current networks, utilizing a Wi-Fi network is likely cheaper than utilizing a cellular network. As such, a default choice may be set to utilize a Wi-Fi network connection. Additionally, an option may be provided in the GUI to change such settings and to provide lists (such as an order list or cost list) of the different transport mediums, as they may differ depending on the network providers' or users' plans.

The GUI may also present technical, transmission strength information to the user relating to the various networks. Such information may include the signal strength(s) of each network, the current transmission rates, the current loss of data rates, etc. One or more aspects of the transmission information may be provided through graphical meters, ribbons, scales etc. in the GUI. Additionally or alternatively, the transmission strength information may be collected and ranked and the "strongest" network may be identified as the network associated with the "strongest" option.

In some cases, there may only be one available choice for transmitting the email due to some circumstance. For example, the connection to cellular network 114 may be temporarily lost. In such as instance, GUI 214 may be modified accordingly to present only the options that are currently viable. If there is only one transmission option currently viable, then GUI 214 may not be generated. Alternatively, a GUI may be generated indicating that only one transmission option is available and requesting that the user confirm use of same for transmission. Alternatively still, if an option is not viable, it may still be presented, but a message may be provided to indicate that the network is not currently available and that if the option is selected, the transmission will be made using that network once it is available. This may be tracked by network communication modules in the device. Unsent messages may be queued within the device until the selected network is available.

As noted earlier, device 108A may be in simultaneous contact with several networks of a given technology. As such, part of the evaluations include evaluating different connections for a given technology for a given option, determining the characteristics of the connections for that option and utilizing the "best" connection for that option.

Referring back to FIG. 2A, after the user initiates a selection, in step 210 device 108A identifies the selected network type for transmission of the email, then processes the data transmission for transmission. It will be appreciated that the term processing a data transmission may include one or more processes, including encoding the email in an appropriate data stream for the selected network and initiating transmission of the data stream over the selected network. Generally, the device transmits all packets for the email over the same network. The tracking data for the transmission modes is also updated.

In other embodiments, step 206 may be done at intervals (e.g. once every minute, 10 minutes, 30 minutes, 60 minutes etc.) and/or at specific events (e.g. when device is turned on, when a "compose" message command is initiated, when a "send" message command is initiated, etc.).

In other embodiments, the GUI of step 208 may not be presented to the user during the composition of a message or may be presented only at selected times and/or events. In such configurations, a set of default option preferences for networks may be established (e.g. through a preferences GUI) for one or more characteristics through a GUI screen which is separate from the composition screen. Through the preferences screen, the transmission characteristics may be ranked. The data and rankings associated with the settings in the GUI screen may be saved. When a message is sent, the data relating to the preferences are reviewed and the characteristics of the networks and the identified default selection may be used without further evaluations. Alternatively, one or more of the preferences may be evaluated to determine the network to use for the transmission. As such, the "default" network may be preset or dynamic. One embodiment may have the default set to the last network by the device. Such data may be stored in a data variable tracked by device 108A. Additionally, such data may be extracted from a transport recipient cache.

In step 208, if the user selects a network to transmit the email that is different from the stored "default" network, in one embodiment, the device 108A can check the transmission characteristics of the selected network and evaluate whether or not device 108A has sufficient coverage in its current location to use the selected network. If the evaluation indicates that there is not sufficient coverage (e.g. weak signal strength, high rate of lost packets, etc.), transmission may be deferred until such sufficient coverage for the selected network is confirmed. This can be confirmed through status messages generated on device 108A.

Another option (not shown) allows the user to select an encoding protocol for the message. Such encoding protocols may include, without limitation: none, S/MIME or PGP.

In an embodiment, the selection of the network is conducted on a per-email basis. In other embodiments, the default network selection may be preset and then subsequently changed.

While the above noted example describes processing of an outbound email message, in other embodiments, other outbound data or messages may be provided with similar options for transmission. For example, other embodiments may process text messages, SMS messages, calendar data, data synchronization messages, semaphores, GPS signals, or other transmissions.

In another embodiment, a transport may be selected by allowing the user to choose the transport during composition of a message instead of after the message is composed and the send command is initiated.

It will be appreciated that an embodiment provides the user of device 108A with more flexibility and options when initiating an outbound data transmission. For example, an embodiment allows a user to specifically select a type of network. This may be beneficial if the user has a specific security concern and requires use of a specific network.

Further still, in other embodiments, a setting may be provided to have inbound data streams monitored on a communication network that is either the same or different than the network selected for outbound communications.

Further still, in other embodiments, error detection and correction algorithms may be used during the data transmission.

Figure 3:
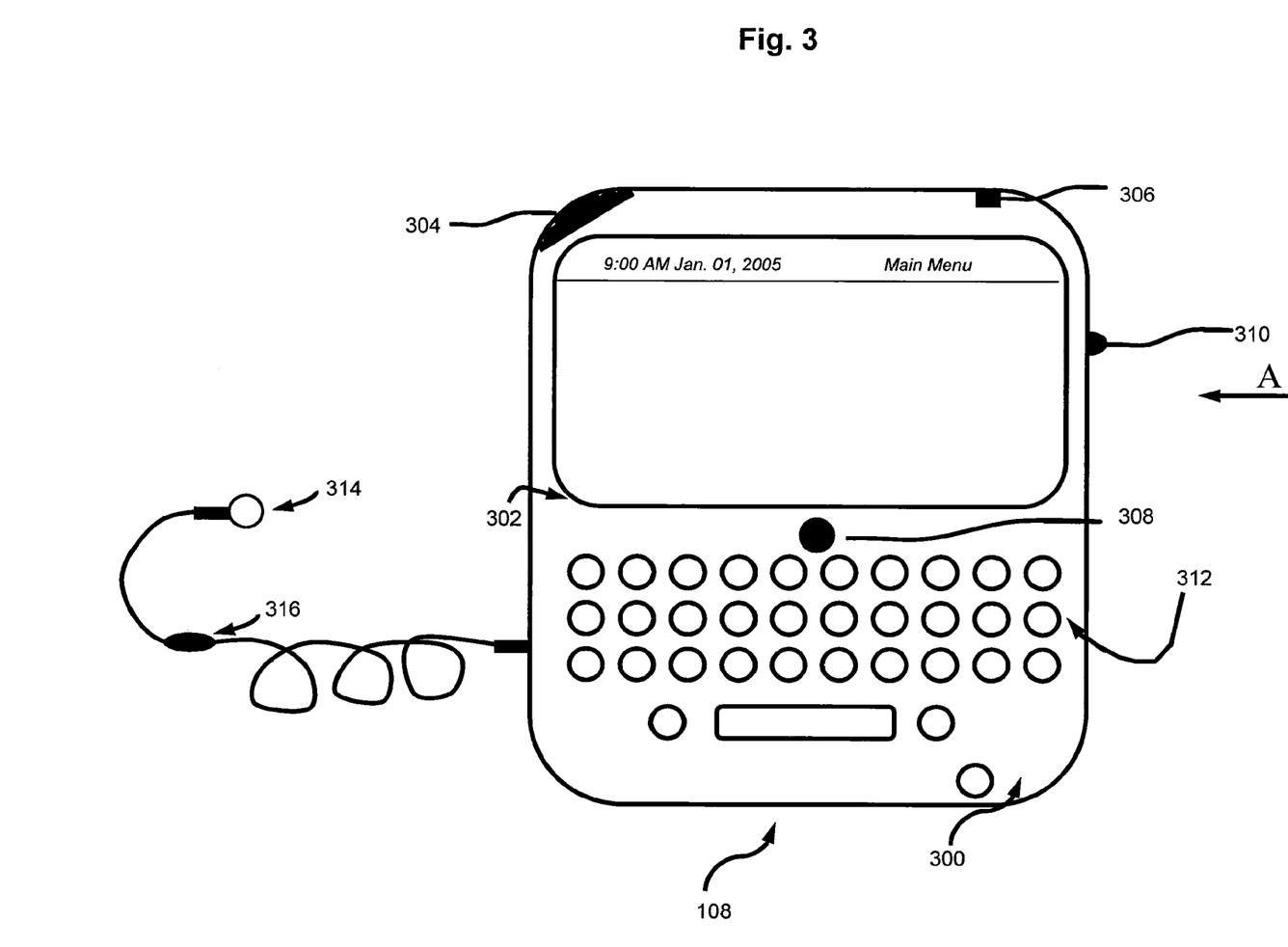
FIG. 3 is a schematic representation of the wireless electronic device in FIG. 1 in accordance with an embodiment.

FIG. 3 provides general features of an electronic device for processing electronic communications in accordance with an embodiment, which is indicated generally at 108. In an embodiment, electronic device 108 is based on a computing platform having functionality of an enhanced personal digital assistant with cellphone and email features. It is, however, to be understood that electronic device 108 can be based on construction design and functionality of other electronic devices, such as smart telephones, desktop computers, pagers or laptops having telephony equipment. In a present embodiment, electronic device 108 includes a housing 300, an LCD 302, speaker 304, an LED indicator 306, a trackball 308, an ESC ("escape") key 310, keypad 312, a telephone headset comprised of an ear bud 314 and a microphone 316. ESC key 310 can be inwardly depressed along the path of arrow "A" as a means to provide additional input to device 108. Similarly, trackball 308 may be depressed inwardly to provide an additional input.

It will be understood that housing 300 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless systems can implement one of the 802.11 protocols, which may include support for voice. Additionally, a Bluetooth network may be supported. Other embodiments include Voice over IP (VoIP) type streaming data communications that can simulate circuit-switched phone calls. Further in other embodiments, device 108 may be able to communicate with a Wi-Max network, i.e. a 802.16-class network. Ear bud 314 can be used to listen to phone calls and other sound messages and microphone 316 can be used to speak into and input sound messages to device 108.

Referring to FIG. 4, functional components of device 108 are provided in schematic 400. The functional components are generally electronic, structural or electro-mechanical devices. In particular, microprocessor 402 is provided to control and receive almost all data, transmissions, inputs and outputs related to device 108. Microprocessor 402 is shown schematically as coupled to keypad 312 and other internal devices. Microprocessor 402 controls the overall operation of the device 108 and its components. Exemplary microprocessors for microprocessor 402 include microprocessors in the Data 950 (trademark) series, the 6200 series and the PXA900 series, all available at one time from Intel Corporation. Microprocessor 402 is connected to other elements in device 108 through a series of electrical connections to its various input and output pins. Microprocessor 402 has an IRQ input line which allows it to receive signals from various devices. Appropriate interrupt firmware is provided which receives and reacts to the signals detected on the IRQ line.

In addition to the microprocessor 402, other internal devices of the device 108 are shown schematically in FIG. 3. These include: display 302; speaker 304; keypad 312; communication sub-system 404; short-range communication sub-system 406; auxiliary I/O devices 408; serial port 410; microphone port 412 for microphone 316; flash memory 414 (which provides persistent storage of data); random access memory (RAM) 416; clock 418 and other device sub-systems (not shown). Device 108 may comprise a two-way radio frequency (RF) communication device having voice and data communication capabilities. In addition, device 108 may have the capability to communicate with other computer systems via the Internet.

Operating system software executed by the microprocessor 402 may be stored in a computer-readable medium, such as flash memory 414, or may be stored in other types of memory devices, such as read-only memory (ROM) or similar storage element. In addition, system software, specific device applications, or parts thereof, may be temporarily loaded into a volatile store, such as RAM 416. Communication signals received by the mobile device may also be stored to RAM 416.

In addition to an operating system operating on device 108, additional software modules 420 enable execution of software applications on device 108. A set of software (or firmware) applications, generally identified as applications 420, that control basic device operations, such as voice communication module 420A and email module 420B (to handle generation of emails and incoming/outgoing messages), may be installed on the device 108 during manufacture or downloaded thereafter. Email module 420B allows the processing of emails, data and other data transmission at by device 108 to enable device 108 to generate views of aspects of the emails, data and data transmissions. As such, inbound and outbound data transmissions can be viewed and processed by email module 420B. In the embodiment, other processes and modules are provided to handle the selection and transmission of the emails, data and data transmissions. These other module receive the completed outbound data transmissions from email module 420B and then parse, package and transmit the resulting data stream through the selected network. As well, software modules, such as calendar module 420C, address book 420D and location module 420E are provided.

Transmission tracking module (TTM) 420M comprises software and/or firmware that tracks data, such as the current state of availability and characteristics of various network with which device 108 has or had a connections. Such data may include relevant connection data such as signal strength, time of last connection, transmission characteristics of the previous n transmissions or any other relevant trackable statistical feature of a transmission. TTM 420M may implement or encode one or more processes as described herein relating to tracking network connections, identifying a particular network connection to use and providing any GUI modules to set transmission defaults and provide options in the GUI for using any defaults or overrides. Additionally or alternatively, a separate module (not shown) may be provided to manage at least part of the GUI relating to the setting of defaults, the presentation of options and the selection of new options for the selected network.

Network connection module (NCM) 420N comprises software and/or firmware that extracts local data relating to a one or more networks, which can then be used by TTM 420M. It also handles the lower level functions for processing communications by device 108.

Additional modules such as a personal information manager (PIM) application may be provided. Any module may be installed during manufacture or downloaded thereafter into device 108.

Data associated with each application, the status of one or more networks, profiles for networks and trigger conditions for commands for networks can be stored and updated in flash memory 414.

Communication functions, including data and voice communications, are performed through the communication sub-system 404 and the short-range communication sub-system 406. Collectively, sub-systems 404 and 406 provide the signal-level interface for all communication technologies processed by device 108. Various applications 420 provide the operational controls to further process and log the communications. Communication sub-system 404 includes receiver 422, transmitter 424 and one or more antennas, illustrated as receive antenna 426 and transmit antenna 428. In addition, communication sub-system 404 also includes processing modules, such as digital signal processor (DSP) 430 and local oscillators (LOs) 432. The specific design and implementation of communication sub-system 404 is dependent upon the communication network in which device 108 is intended to operate. For example, communication sub-system 404 of device 108 may operate with the Mobitex (trademark), DataTAC (trademark) or GPRS mobile data communication networks and also operate with any of a variety of voice communication networks, such as 802.11-class networks, Bluetooth networks, AMPS, TDMA, CDMA, CDMA 2000, PCS, GSM, GPRS, EGDE, UMTS networks etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems and short message service (SMS) systems.

Short-range communication sub-system 406 enables communication between device 108 and other proximate systems or devices, which need not necessarily be similar devices. For example, the short-range communication sub-system may include an infrared device and associated circuits and components, a Wi-Fi or a Bluetooth (™) communication module to provide for communication with similarly enabled systems and devices. Sub-system 406 may have one or more inputs or outputs to sub-system 404 in processing signals for its networks.

In addition to processing communication signals, DSP 430 provides control of receiver 426 and transmitter 424. For example, gains applied to communication signals in receiver 426 and transmitter 424 may be adaptively controlled through automatic gain-control algorithms implemented in DSP 430. One particular operational aspect of receiver 422 and antenna 426 is that they need to be tuned to receive signals in the 802.11 network bands, e.g. signals in the 2.4 GHz to 5.8 GHz range for sub-systems 406 and if needed, sub-system 404. Additional filters on antenna may also be used to provide such functionality. NCM 420N can receive and interpret the signals and can generate its own queries to networks 110 and 114 to acquire technical performance data relating to each network. Such data can then be stored and used by TTM 420M.

Receiver 422, antenna 426 and NCM 420N provide at least some of the hardware and software elements needed to detect when device 108 is in the presence of communication signals from wireless network 110, thereby enabling device 108 to communication with other devices in wireless network 110.

Powering the entire electronics of the device 108 is power source 434. In one embodiment, the power source 434 includes one or more batteries. In another embodiment, the power source 434 is a single battery pack, especially a rechargeable battery pack. In another embodiment, the device may be solar-powered. A power switch (not shown) provides an "on/off" switch for device 108. A power source interface (not shown) may be provided in hardware, firmware, software or a combination of such elements to selectively control access of components in device 108 to power source 434. Upon activation of the power switch an application 420 is initiated to turn on device 108. Upon deactivation of the power switch, an application 420 is initiated to turn off device 108. Power to device 108 may also be controlled by other devices and by software applications 420.

Device 108 may also have global positioning system 436 to assist in identifying a present location of device 108 and may also have light sensor 438 to provide data on the ambient light conditions for device 108.

It will be appreciated that modules 420M, 420N and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 108 may be executing concurrently with any module 420. As such, one or more aspects of modules 420M and 420N may be structured to operate in as a "background" application on device 108, using programming techniques known in the art.

It will be appreciated that a feature of the embodiment provides an easy selection mechanism to allow a user to assess and decide which communication network to use for a transmission. Such a selection mechanism addresses deficiencies in the prior art.

Although an embodiment has been described in terms of evaluating and/or otherwise searching for a set of connections for a multi-mode communication device when it is about to transmit a data transmission, it will be appreciated that in other embodiments, additional tests or accommodations made by made for one or more networks and one or more data communication (both receiving and transmitting) conditions.

As used herein, the wording "and/or" is intended to represent an inclusive—or. That is, "X and/or Y" is intended to mean X or Y or both.

The present invention is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the invention, as defined by the appended claims.

The invention claimed is:

1. A method for selecting a network from a plurality of networks that includes at least a cellular network and a Wireless-Fidelity (Wi-Fi) network for use by a communication device to process an outbound email as a data transmission, the method comprising:
   upon activation of a command to send said outbound email as said data transmission from said communication device, evaluating transmission characteristics for each of said plurality of networks for said data transmission;
   if at least two networks of said plurality of networks are available to said communication device, then displaying a set of transmission options in a user interface on said communication device for processing said data transmission based on said transmission characteristics, said set of transmission options including
      a first option to use a network of said plurality of networks immediately previously used by said communication device to process a previous data transmission;
      a second option to use a first network in said plurality of networks that has a stronger signal strength detected by said communication device than a signal strength of a second network in said plurality of networks detected by said communication device; and
      a third option to use a network of said plurality of networks that has the lowest cost to transmit said data transmission;
   utilizing a selected choice from said set of transmission options as a selected network of said plurality of networks to process said data transmission; and
   processing said data transmission from said communication device using said selected network; and
   if only one network of said plurality of networks is available to said communication device, then processing said data transmission from said communication device using said one network.

2. The method as claimed in claim 1, wherein said set of transmission options further includes:

a fourth option to use a network of said plurality of networks that has a predetermined level of security.

3. The method as claimed in claim 1, wherein said set of transmission options further comprises an attachment option to use a network of said plurality of networks that has been identified to transmit data transmissions having attachments.

4. The method as claimed in claim 1, wherein said set of transmission options further comprises an option to use a network of said plurality of networks that has been identified to transmit said data transmission when said data transmission is a predetermined size.

5. The method as claimed in claim 1, wherein during processing of said data transmission, each data packet associated with said data transmission is marked as being transmitted via said selected network.

6. The method as claimed in claim 1, wherein if said selected network is currently unavailable to said communication device, then processing of said data transmission through said selected network is deferred until said selected network is available to said communication device and generating a message on said user interface indicating that said selected network is currently unavailable.

7. The method as claimed in claim 1, wherein:
said first and second networks utilize the same transmission technology.

8. The method as claimed in claim 1, wherein said evaluating transmission characteristics is performed on a timed interval.

9. The method as claimed in claim 1, wherein:
if said selected network differs from a default network for said communication device, evaluating whether there is sufficient coverage by said selected network device for said communication device at a current location of said communication device and if not, then deferring processing of said data transmission through said selected network until said selected network is available to said communication device.

10. The method as claimed in claim 1, wherein said second option does not use an unavailable network in said plurality of networks.

11. A communication device having communication capabilities with a plurality of networks including at least a cellular network and a Wireless-Fidelity (Wi-Fi) network, the communication device comprising:
a microprocessor;
a display;
memory;
a communication subsystem to process an outbound email as a data transmission sent from said communication device through said plurality of networks;
a first module to track a plurality of transmission characteristics of said plurality of networks and to store results in said memory;
a second module to rank said plurality of networks for said data transmission based on an evaluation of said plurality of transmission characteristics upon activation of a command to send said data transmission from said communication device;
a third module to display a set of transmission options in a user interface on said communication device for processing said data transmission upon activation of said command if at least two networks of said plurality of networks are available to said communication device, said set of transmission options including a first option to use a network of said plurality of networks immediately previously used by said communication device to process a previous data transmission;
a second option to use a first network in said plurality of networks that has a stronger signal strength detected by said communication device than a signal strength of a second network in said plurality of networks detected by said communication device; and
a third option to use a network of said plurality of networks that has the lowest cost to transmit said data transmission; and
a fourth module to process said data transmission at said communication device utilizing said selected network if at least two networks of said plurality of networks are available or if only one network of said plurality of networks is available to said communication device to process said data transmission from said communication device using said one network.

12. The communication device as claimed in claim 11, wherein:
said set of transmission options further includes a cost-based option reflecting said cost of usage.

13. The communication device as claimed in claim 11, wherein:
said fourth module comprises an application operating through said microprocessor to generate and review emails directed to said communication device.

14. The communication device as claimed in claim 11, further comprising:
a fifth module to encode said data transmission in a manner determined from a selected encoding option; and
a fourth option provided by said third module to encode said data transmission prior to said fourth module processing said data transmission using said selected network.

15. The communication device as claimed in claim 11, wherein said fourth module marks each data packet associated with said data transmission as being transmitted by said selected network.

16. The communication device as claimed in claim 11, wherein said fourth module defers transmission of said data transmission through said selected network if said selected network is currently unavailable to said communication device until said selected network is available to said communication device.

17. A method for selecting a network from a plurality of networks for use by a communication device to process an outbound email from said communication device, the method comprising:
tracking a plurality of transmission characteristics of said plurality of networks;
accessing a set of options to identify a set of said plurality of transmission characteristics;
upon activation of a command to send said outbound email from said communication device, evaluating said set of plurality of transmission characteristics for each of said plurality of networks to identify a selected network from said plurality of networks for each option of said set of options;
if at least two networks of said plurality of networks are available to said communication device, then displaying a display on said communication device in user interface a set of options including:
a first option to use an immediately previously used network for said selected network;

a second option to use a first network that has a transmission characteristic stronger than a transmission characteristic of a second network, said first and second networks within said plurality of networks; and
a third option to use a network of said plurality of networks that has a predetermined level of security; and
when a selected option of said set of options is selected through said user interface, processing said outbound email using said selected network associated with said selected option; and
if only one network of said plurality of networks is available to said communication device, then processing said outbound email using said one network, wherein said plurality of networks includes at least a cellular network and a Wireless-Fidelity (Wi-Fi) network.

* * * * *